Dec. 15, 1964   R. J. LANE   3,161,379
AIRCRAFT POWERPLANT
Filed Aug. 15, 1963   6 Sheets-Sheet 1
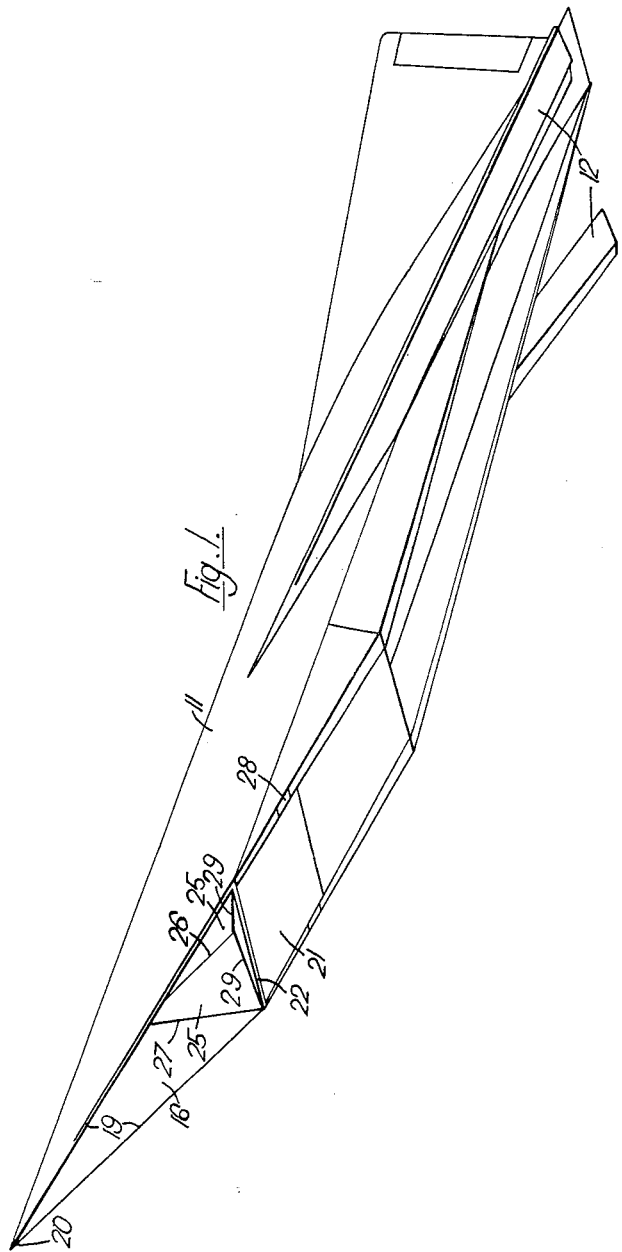
Inventor
Raymond John Lane
By Bailey, Stephens
and Huettig
Attorneys

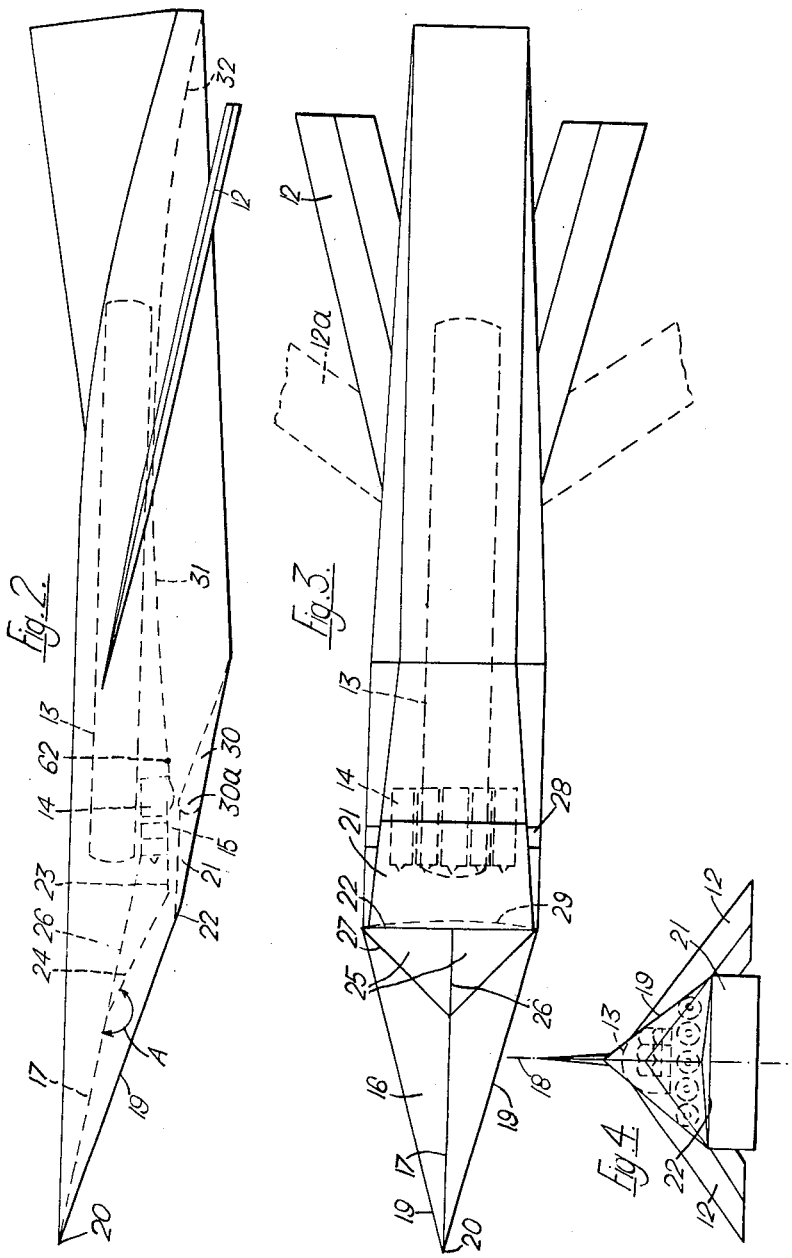

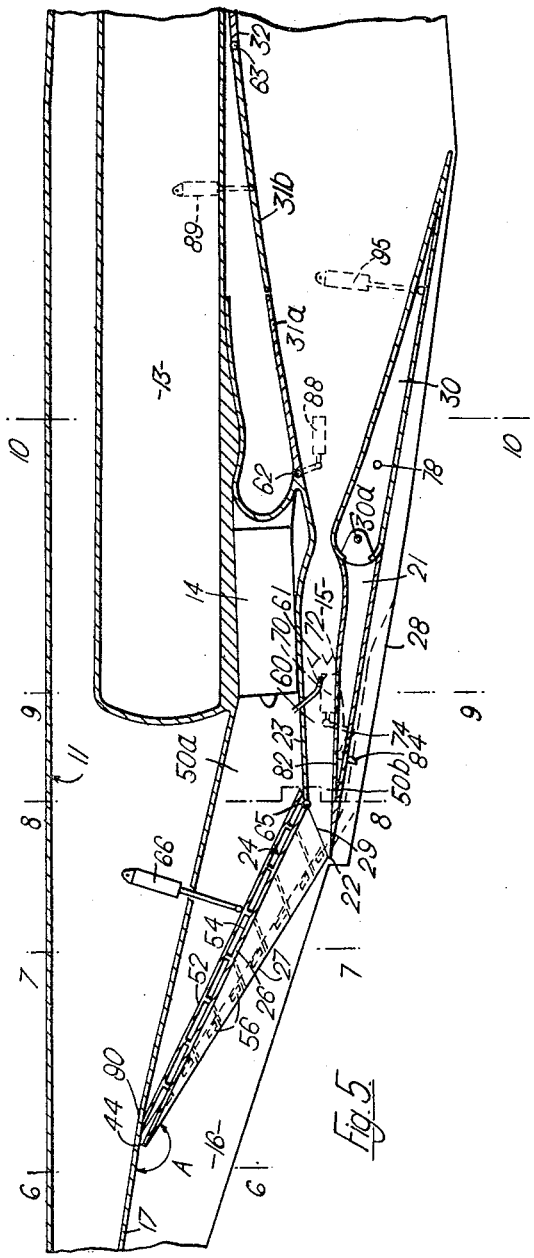

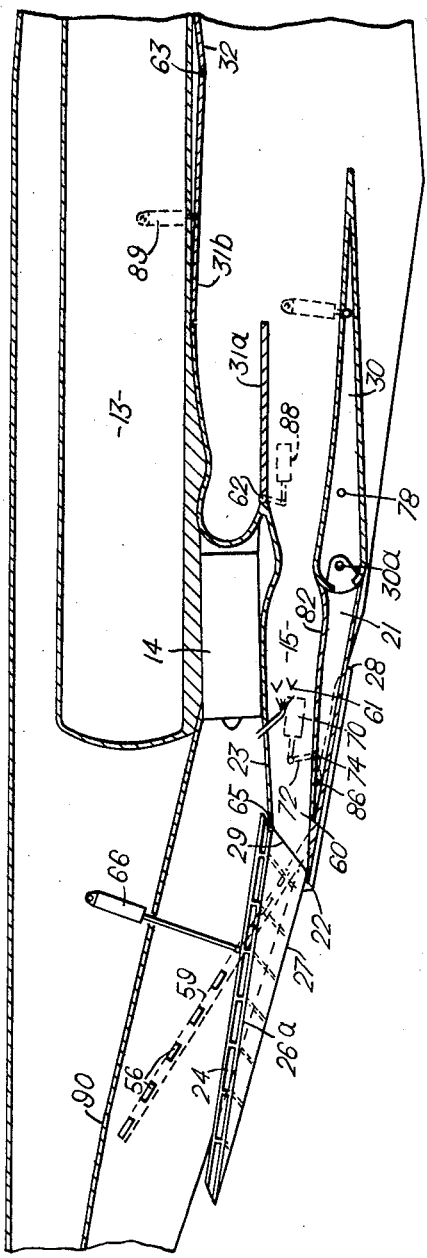

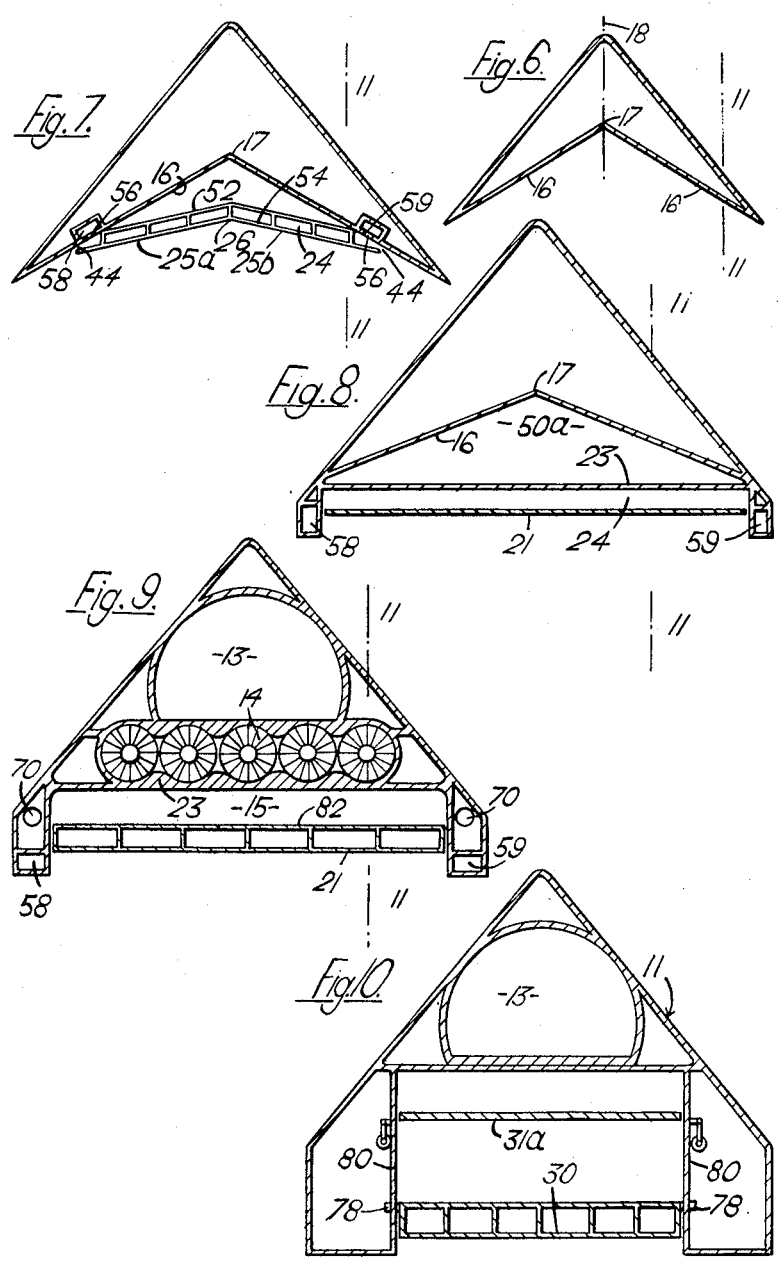

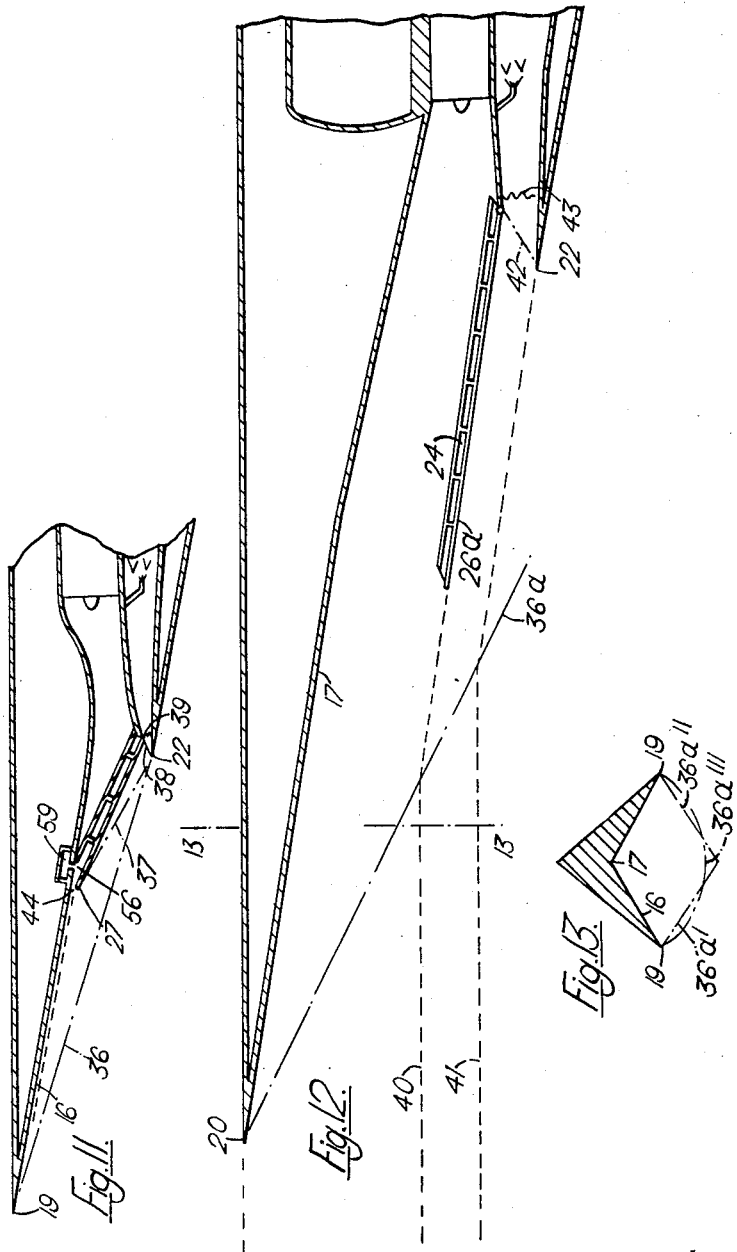

United States Patent Office 3,161,379
Patented Dec. 15, 1964

3,161,379
AIRCRAFT POWERPLANT
Raymond John Lane, Bristol, England, assignor to Bristol
Siddeley Engines Limited, Bristol, England, a British
company
Filed Aug. 15, 1963, Ser. No. 302,388
Claims priority, application Great Britain, Aug. 23, 1962,
32,444/62
8 Claims. (Cl. 244—53)

According to this invention, an aircraft having an airbreathing propulsion power plant capable of propelling the aircraft at supersonic speeds is provided with an air intake for the propulsion plant comprising an inverted valley-shaped ramp having a pair of flat surfaces meeting at a ridge line in a fore and aft plane of intake symmetry and straight leading edges diverging rearwards from a pointed forward end, and a member carrying a lip, this member bridging the valley of the ramp at a position downstream from the pointed forward end.

In aircraft arranged for flight at speeds substantially in excess of the speed of sound, preferably, the ramp referred to in the preceding paragraph is a primary ramp, and a secondary inverted valley-shaped is provided having a pair of flat surfaces meeting at a secondary ridge line which lies in the plane of symmetry through the ridge line of the primary ramp, and which includes an obtuse angle with the ridge line of the primary ramp, the secondary ramp surfaces extending in the downstream direction from leading edges lying alongside the primary ramp surfaces to trailing edges which are spaced from the lip so as to form an air intake opening therewith.

The intake is designed so that at the cruising speed of the aircraft a plane shock wave is formed at the leading edges of the primary ramp, extending rearwards to the lip. In the case where a secondary ramp is provided to form a twin ramp intake, the secondary ramp is similarly designed so that a secondary plane shock wave is formed at the leading edges of the secondary ramp surfaces, which extends rearwards to meet the primary shock wave at the lip.

Valley-shaped air intakes according to the invention have the advantage of being easily incorporated structurally into an aircraft of low-drag configuration; they are efficient aerodynamically, and have an air-flow pattern which is two dimentional at a particular Mach number, referred to as the "design" Mach number, and is approximately so over a useful upward and downward range of Mach numbers, so that their performance at high supersonic and hypersonic speeds is relatively easily predictable. The air flow pattern at the design Mach number is such that stream lines lie in plane parallel to the ridge line of the primary ramp and perpendicular to the plane of symmetry through this ridge line.

In twin ramp intakes according to the invention, the leading edges of the secondary ramp surfaces radiate from the secondary ridge line towards the ends of the lip. They may lie in contact with the primary ramp surfaces, but preferably a gap is left to allow removal of boundary layer air flowing over the primary ramp surfaces. At hypersonic speeds this boundary layer air will be extremely hot and it may be preferable to discharge it directly through openings suitably situated in the surface of the aircraft.

According to a further feature of the invention, in a twin ramp intake, the secondary ramp is arranged to be able to turn downwards about a pivot located at its downstream end, into a position in which its ridge line and imaginary lines parallel thereto upon the secondary ramp surfaces lie substantially parallel to the ridge line and corresponding parallel lines upon the primary ramp surfaces, a second air intake opening thus being formed, lying between the primary ramp surfaces and surfaces on the reverse side, that is the upper side, of the secondary ramp. The first air intake opening may supply air to a ramjet power plant capable of propelling the aircraft at its designed cruising speed, while the second air intake opening, when open, supplies air to a turbojet power plant, for take-off and acceleration up to a speed at which propulsion can be taken over by the ramjet power plant.

The invention is illustrated with reference to the aircraft shown in the accompanying drawings. In these drawings:

FIGURE 1 is a perspective view of an aircraft according to the invention, including turbojet and ramjet propulsion engines;

FIGURES 2, 3 and 4 are respectively a side view, an underneath plan view and a front view of the aircraft;

FIGURE 5 is a longitudinal section of the central part of the aircraft, on a larger scale than FIGURES 1 to 4 showing the construction in greater detail and the positions of the components at the cruising speed of the aircraft;

FIGURE 5A is a longitudinal section corresponding to that shown in FIGURE 5, showing the positions of the components of the aircraft when the turbojet engines are in operation;

FIGURES 6 to 10 are sectiones on the lines 6—6, 7—7, 8—8, 9—9, and 10—10 respectively, shown in FIGURE 5;

FIGURE 11 is a longitudinal section through the front part of the aircraft, on the lines 11—11 in FIGURES 6 to 9, showing the position of shock waves during flight at cruising speed when the ramjet engine is in operation alone;

FIGURE 12 is a longitudinal centre line section through the front part of the aircraft on the same scale as FIGURES 5 and 5A and illustrates operation of the intake at an intermediate stage of acceleration of the aircraft, when the turbojet engines are still in operation; and FIGURE 13 is a cross section on the line 13—13 in FIGURE 12.

The aircraft illustrated in the drawings comprises a body 11 of generally triangular shape in cross-section, having a pair of swept-back wings 12. The wings are pivotally mounted for movement into a position 12a shown in dotted lines in FIGURE 3, having a greater aspect ratio, for take-off and landing. The body includes a passenger compartment 13.

The underside of the forward end of the body 11 extends from a front point 20 and has an inverted valley-shape as shown in FIGURE 6. An air intake is thus formed, for supplying air to a power plant housed in an engine bay in the lower part of a middle section of the body; the power plant comprises five turbojet engines 14 and a ramjet power plant having a combustion chamber 15. The chamber 15 may be subdivided by vertical partitions to form a system of chambers.

The inverted valley-shaped intake comprises a primary ramp, having a pair of flat primary ramp surfaces 16 meeting at a ridge line 17 in a fore and aft plane of intake symmetry 18, and straight leading edges 19 which diverge rearwards from the front point 20 of the body 11. A member 21 constituting the bottom of the engine bay has a flat undersurface terminating at its forward end in a lip 22 which bridges the inverted valley between the surfaces 16, and forms a lower boundary to the air intake opening. An upper wall 23 of the ramjet combustion chamber 15 constitutes a partition which divides the air intake opening between the lip 22 and the pirmary ramp surfaces 16 into two parts, one part 50a for air going to the turbojet engines 14, and one part 15b for air going to the ramjet combustion chamber 15.

When the aircraft is flying at its cruising speed, the part 50a of the intake opening supplying air to the turbojet engines 14 is closed as shown in FIGURE 5 by a structure 24 constituting a secondary inverted valley-shaped ramp for the ramjet part 50b of the intake opening, the secondary ramp having a pair of flat ramp surfaces 25a and 25b which meet at a secondary ridge line 26 in the plane of symmetry 18. The ridge lines 17 and 26 include an obtuse angle A between them, shown in FIGURES 2 and 5. The secondary ramp surfaces 25 have leading edges 27 which radiate towards the ends of the lip 22 and lie along the primary ramp surfaces 16, a gap 44 being left along these leading edges, to allow removal of boundary layer air flowing over the primary ramp surfaces 16.

The secondary ramp structure 24 is formed having two skins; an upper skin 52 forms a seal against the primary ramp surfaces 16, and prevents boundary layer air from passing into the turbojet engines, and a lower skin 54 has lower surfaces which form the secondary ramp surfaces 25, and stop short of the primary ramp surfaces 16, leaving the gap 44 for passage of boundary layer air. The boundary layer air passes out through openings 56 in the surfaces 16, as shown in FIGURES 5 and 7, and flows through ducts 58, 59 to outlets 28 in the undersurface of the member 21.

The secondary ramp surfaces 25 extend downstream to trailing edges 29 spaced from the lip 22 so as to form the air intake opening 50b therewith.

The intake is designed in respect of the angles of incidence of the ridge lines 17, 26 to the free airstream, and the anhedral angles of the ramp surfaces 16, 26, so that, as illustrated in FIGURE 11, at the cruising speed of the aircraft, which may for example be of the order of Mach 7, a plane primary shock wave 36 is formed at the leading edges 19 of the primary ramp surfaces and extends rearwards to the lip 22, while a secondary plane shock wave 37 is formed at the leading edges 27 of the secondary ramp surfaces 25 and likewise extends rearwards to the lip 22. Further information regarding the aerodynamic characteristics of anhedral-delta surfaces is given in Report No. 22644 of the Aeronautical Research Council of Great Britain, by T. Nonweiler, B. Sc., Ph. D.

After passing through the shock waves 36 and 37 and a tertiary shock wave 38 extending from the lip 22 towards the ramp surfaces 25, the air enters the ramjet combustion chamber 15 of the ramjet power plane through a subsonic diffuser 60, a normal shock wave 39 being formed where the speed becomes subsonic. Fuel is injected at 61 as shown in FIGURE 5, and is burnt within the chamber 15. The products of combustion are discharged as a propulsive jet through a nozzle defined on its lower side by an outlet flap 30 forming an extension of the member 21, the outlet flap 30 being hinged at 30a to the member 21, and on its upper side partly by the two parts 31a, 31b of a turbojet outlet closure door system 31, and partly by an expansion surface 32 formed on the underside of the aircraft body 11. The part 31a is hinged at 62 to the upper wall 23 of the ramjet combustion chamber 15, and may be swung downwards by means of a jack 88 from the position shown in FIGURE 5 to the position shown in FIGURE 5A when the turbojet engines are operating; under the same conditions the part 31b which is pivoted at 63 to the surface 32, may be swung upwards by means of a jack 89 to the position shown in FIGURE 5A.

The structure 24 forming the secondary ramp is pivotally mounted at 65 so that it may be swung downwards by means of a jack 66 into the position shown in FIGURES 5A and 12, where ridge line 26 takes up its position 26a; in this position the ridge line 26a and other (imaginary) lines parallel to it upon the surfaces 25 lie parallel to the ridge line 17 and corresponding lines on the surfaces 16 of the primary ramp.

In operation, the secondary ramp structure 24 is maintained substantially in the position shown in FIGURES 5A and 12, although possibly with some slight adjustment out of parallelism if required, from take-off to the speed at which shutting down of the turbojet engines 14 begins, which may be for example at about Mach 3.

Operation at the speed reached immediately prior to the beginning of shut-down of the turbojet engines 14 is illustrated in FIGURES 12 and 13. A primary shock wave 36a extends obliquely rearwards from the pointed end 20, but at this speed does not touch the lip 22. Theoretically, in the case in which there is no spill over the leading edges 19, the shock wave 36a is composed of two plane parts 36a' and 36a'' meeting in the plane of symmetry as illustrated in FIGURE 13, but in practice it is thought more probable that, especially at Mach numbers appreciably below the design Mach number, the shock wave takes a curved form in transverse sections, such as 36a''', and tends to become detached from the leading edges. The boundary streamline of the air entering the turbojet engines is indicated at 40. After refraction in passing through the primary shock wave 36a, this streamline coincides in direction with the downwardly swung secondary ramp ridge line 26a. The turbojet air above this streamline passes into the turbojet engines 14, preferably by way of a further diffuser system, not shown.

The lower boundary streamline of the air entering the ramjet combustion system is shown at 41. After refraction in passing through the primary shock wave 36a it strikes the lip 22 of the engines bay bottom member 21, which generates a secondary shock wave 42. Thereafter the speed falls to subsonic as the air passes through a normal shock wave 43.

The engine bay bottom member 21 is preferably movably mounted on the body of the aircraft so that the cross-sectional area of the ramjet combustion system 15 may be varied in dependence upon Mach number to assist the combustion process (as described in the specification accompanying our co-pending United States patent application Serial No. 277,152).

As shown in FIGURES 5 and 5A, the member 21 is connected at its front end to control jacks 70 by means of bellcrank levers 72 pivoted at 74 and at its rear or downstream end it is pivoted at 30a to the outlet flap 30. The outlet flap 30 is pivoted at 78 to the fixed sides 80 of the body 11 of the aircraft, as shown in FIGURE 10. When the control jacks 70 are actuated, the bottom wall 82 of the combustion chamber 15, which is the top wall of the member 21, is moved approximately parallel to itself. The fixed sides 80 are slotted at 84 so as to allow movement of pins 86 connecting the member 21 to the bellcrank levers 72.

The bottom member 21 will be moved to give a reduction in the combustion system cross-sectional area in going from the condition illustrated in FIGURES 5A and 12 to the higher speed condition shown in FIGURES 5 and 11 as the turbojet engines are shut down. Concurrently, the hinged outlet flap 30 extending from the bottom member 21 is turned downwards by means of its jack 95 to increase the nozzle exit area.

Additional supersonic diffusion may be obtained in the air intake for the turbojet engines 14, by providing a slight change in the angle of inclination of the ridge line 17 to the direction of the free airstream, at a point 90 along its length, as shown in FIGURES 5 and 5A.

The turbojet engines may be replaced by turbo-rocket-engines, i.e., engines incorporating a ducted fan driven by a turbine, operating on fuel and oxidant carried by the aircraft, and rocket boosters may be provided if necessary to assist take-off or acceleration through the transonic region.

I claim:
1. An aircraft having an air-breathing propulsion power plant capable of propelling the aircraft at supersonic speeds, including an air intake for the propulsion plant having an upper wall comprising an inverted valley-shaped ramp having a pair of flat surfaces meeting at a ridge line in a fore and aft plane of intake symmetry and sloping laterally downwardly from said ridge line, said flat surfaces having straight leading edges diverging rearwards from a pointed front end, and a member bridging the valley of the ramp at a level below the ridge line and having a lip at its forward edge at a position downstream from the pointed end.

2. An aircraft according to claim 1 in which the air intake further comprises a secondary inverted valley-shaped ramp having a pair of flat surfaces meeting at a secondary ridge line which lies in the plane of symmetry through the ridge line of the primary ramp, and which includes an obtuse angle with the ridge line of the primary ramp, the secondary ramp surfaces extending in the downstream direction from leading edges lying along the primary ramp surfaces between its ridge line and the ends of the lip to trailing edges which are spaced from the lip so as to form an air intake opening therewith.

3. An aircraft according to claim 2 in which there is a gap between the leading edges of the secondary ramp surfaces and the primary ramp surfaces, to allow removal of boundary layer air flowing over the primary ramp surfaces.

4. An aircraft according to claim 3 in which the primary ramp surfaces have openings through which the boundary layer air passes, and the surface of the aircraft has outlets through which the boundary layer air is discharged, means being provided to lead the air from the openings to the outlets.

5. An aircraft according to claim 2 including means for turning the secondary ramp downwards about a pivot located at its downstream end, into a position in which its ridge line and imaginary lines parallel thereto upon the secondary ramp surfaces lie substantially parallel to the ridge line and corresponding parallel lines upon the primary ramp surfaces, so as to form in addition to a first air intake opening between the lip and the secondary ramp surfaces, a second air intake opening between the primary ramp surfaces and surfaces on the reverse side, that is the upper side, of the secondary ramp.

6. An aircraft according to claim 5 in which the first air intake opening supplies air to a ramjet power plant capable of propelling the aircraft at its designed cruising speed, while the second air intake opening, when open, supplies air to a turbojet power plant, for take-off and acceleration up to a speed at which propulsion can be taken over by the ramjet power plant.

7. An aircraft according to claim 1 having a body whose forward part is of generally triangular cross section extending rearwards from a pointed front end forming an air intake, and whose middle section houses the power plant.

8. An aircraft according to claim 7 having a pair of swept-back wings pivotally mounted so that their aspect ratio may be adjusted.

References Cited by the Examiner
UNITED STATES PATENTS

| | | | |
|---|---|---|---|
| 3,027,118 | 3/62 | Willox | 244—53 X |
| 3,062,484 | 11/62 | Himka | 244—53 |
| 3,066,483 | 12/62 | Stratford | 60—35.6 |

FERGUS S. MIDDLETON, *Primary Examiner.*

ANDREW H. FARRELL, *Examiner.*